United States Patent [19]

Hwang et al.

[11] Patent Number: 4,828,588
[45] Date of Patent: May 9, 1989

[54] PROCESS FOR PREPARATION OF HETEROGENEOUS POLYSILOXANE MEMBRANE AND MEMBRANE PRODUCED

[75] Inventors: Sun-Tak Hwang; Dong Li; Damon R. Seok, all of Cincinnati, Ohio

[73] Assignee: University of Cincinnati, Cincinnati, Ohio

[21] Appl. No.: 176,644

[22] Filed: Apr. 1, 1988

[51] Int. Cl.$^4$ ............................................. B01D 53/22
[52] U.S. Cl. ..................................... 55/158; 55/389; 427/227; 427/294; 428/307.3; 428/312.6; 428/429
[58] Field of Search ....................... 55/16, 68, 75, 158, 55/389; 427/227, 228, 294, 407.2; 428/307.3, 312.6, 312.8, 429; 502/343, 347

[56] References Cited

U.S. PATENT DOCUMENTS

| | | | |
|---|---|---|---|
| 2,691,605 | 10/1954 | Hediger | 428/312.6 |
| 2,966,235 | 12/1960 | Kammermeyer | 55/16 |
| 3,279,902 | 10/1966 | Gardner | 55/16 X |
| 3,492,153 | 1/1970 | Ervin, Jr. | 428/312.6 X |
| 3,511,031 | 5/1970 | Ketteringham et al. | 55/158 |
| 3,567,666 | 3/1971 | Berger | 55/16 X |
| 3,611,676 | 10/1971 | Christen et al. | 55/16 |
| 3,640,901 | 2/1987 | Lee et al. | 55/158 X |
| 3,957,559 | 5/1976 | Hoffman, Jr. | 55/158 X |
| 4,068,037 | 1/1978 | Debolt et al. | 427/228 X |
| 4,366,191 | 12/1982 | Gistinger et al. | 427/228 |
| 4,472,454 | 9/1984 | Houdayer et al. | 427/228 X |
| 4,533,369 | 8/1985 | Okita | 55/16 X |
| 4,582,751 | 4/1986 | Vasilos et al. | 428/307.3 |
| 4,664,681 | 5/1987 | Anazawa et al. | 55/158 |
| 4,666,668 | 5/1987 | Lidorenko et al. | 55/158 X |
| 4,696,686 | 9/1987 | Usami et al. | 55/158 |

FOREIGN PATENT DOCUMENTS

| | | | |
|---|---|---|---|
| 175668 | 3/1986 | European Pat. Off. | 55/158 |
| 177312 | 4/1986 | European Pat. Off. | 428/312.6 |
| 55007 | 4/1983 | Japan | 55/158 |
| 2548 | 1/1986 | Japan | 55/158 |
| 107921 | 5/1986 | Japan | 55/158 |
| 157325 | 7/1986 | Japan | 55/158 |
| 59510 | 3/1987 | Japan | 55/158 |
| 39519 | 9/1983 | U.S.S.R. | 55/158 |
| 711374 | 6/1954 | United Kingdom | 428/429 |
| 936974 | 9/1963 | United Kingdom | 428/429 |

OTHER PUBLICATIONS

Kaiser et al, Journal of Membrane Science 22, 257-268 (1985).
Schroeder et al, Physics of Thin Films vol. 5, Academic Press, NY 87-140 (1969).
Undated abstract of a talk presented at the ACS meeting in Denver 1987.

*Primary Examiner*—Robert Spitzer
*Attorney, Agent, or Firm*—Wood, Herron & Evans

[57] ABSTRACT

A heterogeneous glass silicone membrane is formed by reacting in situ a silane monomer and an aqueous catalyst solution. The polymerization reaction is controlled so that the polymerization occurs within the porous glass support member. This is caused by allowing the aqueous catalyst to permeate into the glass support member at the same time the silane monomer is permeating into the member from the opposite side. By controlling monomer amount, temperature, catalyst amount and the like the polymerization occurs under controlled conditions inside the support member.

Further a molecular sieve can be formed by pyrolysis of the formed heterogeneous membrane. Both the heterogeneous membrane and the molecular sieve can be used in a separation of gases.

24 Claims, 1 Drawing Sheet

4,828,588

PROCESS FOR PREPARATION OF HETEROGENEOUS POLYSILOXANE MEMBRANE AND MEMBRANE PRODUCED

BACKGROUND OF THE INVENTION

There are various methods of separating gases. One particular method is membrane separation which employs the permselectability of a membrane at various conditions to facilitate separation of one or more gases. Industrial applications demand separation membranes that are highly selective and have very good mechanical properties at high temperatures.

Organic membranes are typically employed to provide a gas phase separation medium which is very selective. Unfortunately, these selective membranes particularly the polysiloxane membranes do not possess good mechanical properties at higher temperatures.

On the other hand, inorganic membranes do possess excellent high temperature mechanical properties. These membranes are generally formed from various vitreous compositions such as porous glass particularly Vycor glass manufactured by Corning Glass Works. Unfortunately, these inorganic microporous membranes do not possess the requisite selectivity for many industrial applications.

Accordingly, there is a need to combine the benefits of an organic polysiloxane membrane with an inorganic membrane.

Unfortunately, the end use requirements demand that first the inorganic support must in fact be a microporous support. If the pores are too large the membrane itself will be too weak and will rupture. This compounds the problem that the organic portion must be evenly distributed throughout the inorganic member. For example, simply coating the surface of an inorganic support member with a polydimethylsiloxane film does not provide a good separation medium.

There have been attempts to provide a heterogeneous film formed by in situ polymerization of a polydimethylsiloxane on an inorganic support member. For example, Shroder et al, Physics of Thin Films Vol. 5, Academic Press, NY 87-140 (1969) discusses a process for the modification of the surface of an inorganic media with a synthetic polymer. The polymer or prepolymer is converted to a liquid state either by melting or dissolving. It is then coated on the outside surface. This is an ineffective separation medium.

Kaiser et al, Journal of Membrane Science 22, 257–268 (1985) discuss various methods of polymerization of polydimethlsiloxane on a glass scrim filter medium. These primarily discuss methods whereby the polydimethylsiloxane film is formed on an inorganic support positioned between two reactive liquid solutions, an aqueous catalyst solution and an aqueous solution of the monomer. When the monomer is in an aqueous solution it tends to react to form a prepolymer with the cyclic tetramer predominating in the resulting mixture. This does not effectively form a polymer within an inorganic member.

The Kaiser article also discloses a gas phase reaction. The inorganic support is soaked with catalyst solution and placed above a silane bath. Vapors from the bath react when contacting the catalyst solution. This forms a silicone coating on the exterior surface of the support. Because the support layer is soaked in the catalyst it is impossible to accurately control the thickness of the coating. It is further desirable to have the silicone material inside the porous material and simply not on the surface of the porous material.

SUMMARY OF THE INVENTION

The present invention is premised on the realization that a heterogeneous separation membrane can be formed by in situ polymerization of a silane material within a microporous silica glass membrane. The in situ polymerization within the porous glass member is provided by concurrently passing a reactive silane monomer from one side of the porous glass into the porous glass and an aqueous solution of a catalyst from the opposite side of the porous glass into the porous glass. By controlling monomer content, catalyst content, and the partial pressures of the atmospheres in situ polymerization will occur within the porous glass member. Further by controlling certain parameters the thickness of the formed polymer can be controlled.

The present invention further provides a method of forming a cylindrical heterogeneous membrane by introducing either the monomer or catalyst to the interior of a microporous tubular member and rotating the tubular member while at the same time exposing the exterior surface of the tubular member to the other of the monomer or catalyst. Again, by controlling monomer content, catalyst content, temperature and the rotation of the tube, formation of the polymer within the wall of the glass tube will occur and the thickness of the formed polymer can be controlled.

The present invention is further premised on the realization that such a heterogeneous membrane can be pyrolyzed to form a molecular sieve which can be used in various separation operations particularly gas separation.

Objects and advantages of the present invention will be further appreciated in light of the following detailed description and drawings, in which:

DETAILED DESCRIPTION OF THE INVENTION

A heterogeneous membrane includes a porous glass member in combination with a polysiloxane portion. The polymer is formed in situ directly by reacting monomer in the presence of a catalyst.

For purposes of the present invention, suitable monomers for use in forming the polysiloxane portion of the heterogeneous membrane can include dichlorodimethylsilane, methyltrichlorosilane, dichloromethylsilane, propyltrichlorosilane, dichlorodiethylsilane, pentyltrichlorosilane, dichloromethylphenylsilane, dichlorodiphenylsilane, (chloromethyl) trichlorosilane, and trichlorovinylsilane. Other silanes which do not include chloro groups include vinyltrimethoxysilane, methyltrimethoxysilane, diethoxydimethylsilane, trimethoxysilane, and triethoxysilane.

Depending on the monomer used various catalysts can be employed. Catalysts include both aqueous basic solutions as well as aqueous acidic solutions. Where the monomer includes a halogen such as the dichloromethylsilane, it is preferable to use a basic catalyst. The polymerization reaction yields halogen ions which when in solution generate a great deal of heat which can harm the glass membrane. Accordingly, it is important to neutralize the formed chlorine as it is formed to avoid the extremely exothermic reaction.

Accordingly, when the monomer is a halogenated monomer basic catalysts such as aqueous ammonium hydroxide, aqueous ammonium acetate, aqueous ammonium bicarbonate, aqueous ammonium bromide, aqueous ammonium dihydrogen phosphates, aqueous ammonium carbonate and aqueous ammonium formate are employed. In the present invention, the chemistry per se is well known to those of ordinary skill in the art. The polydimethylsiloxane are formed by well known chemical reactions. The above list of monomers and catalysts is merely exemplary.

The composition of the formed polysiloxane will vary depending on the chemical formula of the monomers. In the present invention, polysiloxane is intended to include polyarylsiloxanes and poly alkyl siloxanes. The chemistry of the siloxanes is well known.

The support or porous medium used in the present invention is a porous vitreous material having pore sizes of generally from about 20 angstroms to about 800 angstroms. When the pore size is less than 20 angstroms the present invention yields relatively less benefit. When the pore size is greater than 800 angstroms the formed heterogeneous membrane tends to be weak. A preferred material is Vycor brand porous glass which is sold by Corning Glass Works. It is formed primarily of silica (96% silica) and has a very well defined pore size. Generally, the purchased material has a pore size of 40 angstrom and a pore volume of about 30%. Other vitreous materials having porosity and with different pore sizes can be purchased.

Figure 1:
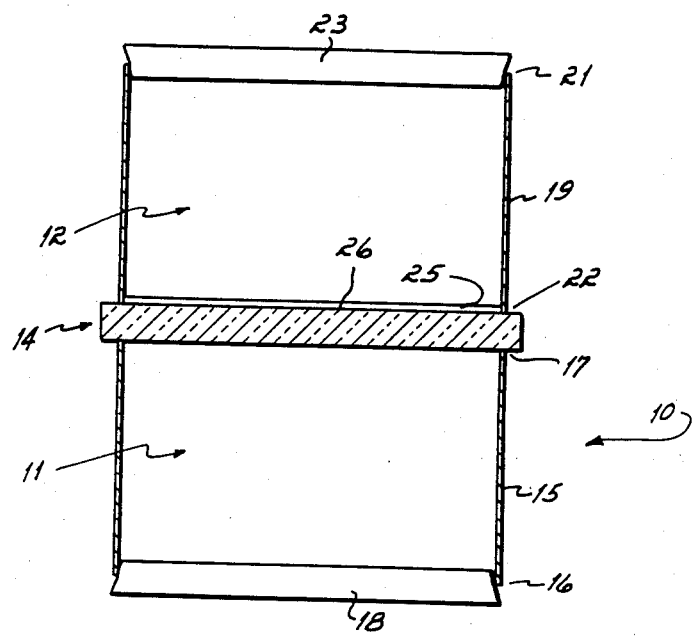
FIG. 1 is a cross-sectional view of the method and apparatus of the present invention.

The method of forming the heterogeneous vitreous/polysiloxane membrane can be further appreciated with reference to FIG. 1. This apparatus 10 includes a lower monomer chamber 11, an upper catalyst chamber 12 separated primarily by the porous medium 14. The monomer chamber is a cup-shaped chamber which has a tubular wall 15 and is initially opened at both ends 16 and 17. Bottom 16 however is closed off by a stopper 18 forming the bottom of the chamber. The top of the chamber 17 remains open. Placed above this opening 17 and effectively closing off the monomer chamber is the porous medium 14.

Above the porous medium 14 is the catalyst chamber 12. Catalyst chamber 12 again includes a tubular wall 19 which is open at its upper end 21 and its bottom end 22. However, upper end 21 is closed off by a stopper 23. The opening 22 at the bottom end rests on the porous media 14 which in effect closes off the chamber. A porous absorbent material 25 is positioned on the upper surface 26 of the porous medium 14. The absorbent material readily absorbs water and soaks up the catalyst solution. This absorbent material is preferably a cellulosic material such as simply paper towel material. Any absorbent porous material that is relatively inert to the catalyst can be used.

The heterogeneous membrane is formed by polymerizing monomer in the pores of the porous medium. In order to ensure that the reaction occurs in the pores as opposed to on the surface of the porous medium, the monomer is simply injected into the monomer chamber. Temperature allows the monomer to saturate the atmosphere within the chamber and thus migrate to and into the porous medium. More particularly, the monomer such as dichlorodimethylsilane is introduced into the monomer chamber 11 by injecting it through the stopper 18. The monomer chamber is a fixed volume chamber closed on the bottom by the stopper 18 and the top by the porous medium 14.

At the same time the monomer is migrating into the porous medium the catalyst is injected into the catalyst chamber through stopper 23. Again, this is a fixed volume chamber closed at the top by stopper 23 and at the bottom by porous medium 14.

The basic idea of the invention is that at one temperature the monomer, water and catalyst will evaporate and produce saturated pressure in the two chambers. If the pressure in the monomer chamber is higher than that in the catalyst chamber, the monomer vapor will defuse through the porous medium. When the monomer molecules meet the water the hydrolysis reaction takes place to form silanol. When two or more silanols appear close enough to each other the intermolecular condensation reaction will take place to form polysiloxane. Such conditions will guarantee that most parts of the polymerization will occur in the pores instead of outside on the surface of the medium.

According to this principal, it is important to control the pressure difference across the porous medium by adjusting the temperature. If the pressure difference across the media is too high, the speed of the monomer diffusion is greater than the hydrolysis reaction and a part of the monomer will diffuse into another chamber and polymerize there instead of in the pores. But if the pressure difference across the support is too small, it is possible for the water and catalyst to diffuse to the monomer chamber.

An absorbent material 25 is positioned on the porous medium in the catalyst chamber 12. The absorbent material preferably a paper towel or some other tissue is used to cover the surface of the porous medium 14. Between the surface of the porous media and the absorbent material the water will form a very thin film. At operating temperature as the saturated pressures of the water and catalyst are different, there are more catalyst molecules in the space than in the absorbent layer. This will permit catalyst to be consumed by formed hydrochloric acid. When the amount of catalyst in the absorbent layer is consumed by the hydrochloric acid the catalyst in the space between the absorbent material and the porous medium will be dissolved into the absorbent layer to maintain the equilibrium of catalyst concentration in these two phases. In this way the hydrolization and condensation reaction rates are easily controlled.

To further control polysiloxane membrane thickness within the porous media 14, one can control the molar ratio of monomer to water and catalyst to water. The ratio of monomer to water should be above 0.005 and preferably between 0.006 to 0.012 with the most preferred range being about 0.009 to about 0.01. Increasing the ratio of monomer to water will increase the thickness of the formed polydimethylsiloxane membrane. In all of these reactions it is preferable to use about 25-100 grams of monomer per square meter of membrane area preferably 50-100.

The molar ratio of catalyst to water should be above 0.009 and preferably from about 0.01 to about 0.2 with the most preferred range being from 0.05 to about 0.08. Again increasing the catalyst concentration will increase the thickness of the formed polydimethylsiloxane portion of the heterogeneous membrane.

With the apparatus set up as described with respect to FIG. 1, the basic catalyst solution is simply allowed to wet the absorbent material. At the same time the predetermined amount of monomer is fed into the monomer chamber. When a flat sheet of heterogeneous membrane is going to be prepared the monomer chamber is kept down and the catalyst chamber is maintained above the monomer chamber.

The reaction time will vary based on reaction temperature, catalyst concentration and monomer present. Preferably, the reaction temperature will be from about −5° about 25° C. with about 0°–5° C. being preferred. The reaction time can again vary depending on the temperature and should range anywhere from 0.5 hours up to 24 hours, with 12–24 hours being preferred. It should be pointed out with respect to reaction time that in situ polymerization within the pores of the porous media is occurring. Once these pores are closed off with formed polysiloxane the reaction will stop because the catalyst and water are separated from the monomer. If the reaction occurs very slowly, a very thin film of siloxane will plug the holes. When the reaction is conducted at higher rates, a thicker polysiloxane portion will plug the holes and thus the polysiloxane portion will be thicker.

Upon completion of the reaction, the chambers are separated from the porous media and the absorbent material is likewise. The surface of the porous media is then washed with air or water and allowed to dry.

Figure 2:
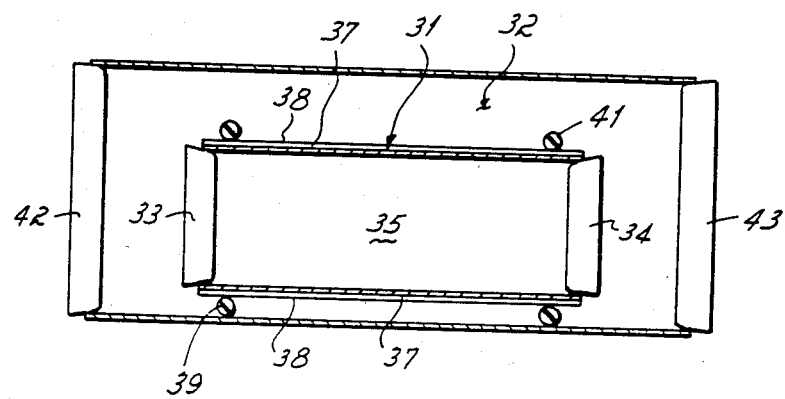
FIG. 2 is a cross-sectional view of an alternate embodiment of the present invention showing the formation of a tubular heterogeneous membrane.

An alternate method of preparing a heterogeneous membrane according to the present invention uses the apparatus shown in FIG. 2. In this embodiment a hollow microporous membrane is formed. In this embodiment in situ polymerization occurs in the wall of a tubular microporous medium 31. The reaction occurs within a tubular reaction chamber 32 which is slightly larger than the tubular microporous medium 31. In this embodiment, the tubular microporous medium 31 is closed off with a stopper 33 on a first side and a stopper 34 on the second side forming an inner chamber 35. The inner chamber can be either a monomer chamber or a catalyst chamber depending on what is preferred.

Where the chamber 35 acts to hold the monomer the exterior surface 37 of the porous medium 31 is surrounded by a layer of absorbent material 38 preferably paper towels. This is held tightly to the outer surface 38 by a pair of rubberbands 39 and 41. The tubular reaction vessel 32 is closed off at the ends with stoppers 42 and 43.

To conduct a reaction the monomer is injected through either of the stoppers into the monomer chamber within the hollow porous medium and likewise the catalyst is injected into the catalyst chamber. The reaction vessel is then rotated. This causes the monomer to uniformly contact the membrane surface.

In one embodiment the outside diameter of the porous medium 31 will be about 0.8 cm, the wall thickness of about 0.1 cm. The reaction vessel 32 will be a glass tube having a 1.3 cm inside diameter. Basically with the absorbent material 38 surrounding the porous medium 31 there is only a relatively slight clearance between the porous medium and the wall of reaction vessel 32. When the catalyst and water solution is injected into the reaction vessel 32 through stopper 42 the solution will basically contact the porous medium, be absorbed on it, and thus directly contact the porous medium 31.

As with a flat heterogeneous membrane as described with respect to FIG. 1 the monomer to water ratio and catalyst to water ratio as well as temperature control the reaction rate as well as the thickness of the formed polysiloxane within the pores of the medium 31. However, the speed of rotation of the porous medium 31 will also have an effect on the rate of reaction. Increasing the rate of rotation increases the rate at which the monomer travels through the porous medium and will control the reaction rate and thickness.

Generally, the rotation rate can range from about 10 revolutions per minute to about 100 per minute and can be varied during the reaction. For example, during the initial portions of the reaction, the first hour the rotation may be at a higher speed about 30–50 revolutions per minute followed by a slower speed at the remaining portion of the reaction for example at about 10 revolutions per minute.

Upon completion of the reaction, the absorbent material is slit and removed from the surface of the porous medium 31 and the surface is washed with distilled water or pressurized air and dried at 120°–150° C. for about 1–3 hours to evaporate water within the pores. The invention will be further appreciated in light of the following detailed examples.

EXAMPLE 1

This example illustrates the preparation of a tube form heterogeneous Vycor-polydimethylsiloxane membrane.

The system as shown in FIG. 2 has a tubular reaction vessel and tubular Vycor glass Corning Glass Works product (glass No. 7930) as the porous medium 31. This has an outside diameter of 0.8 cm, a wall thickness of 0.1 cm and a length of 17.5 cm. The two ends of the porous medium 31 were closed with rubber stoppers. Three layers of paper towels were entwined around the outside surface as the absorbent material. Two plastic rings were used to tighten the absorbent layer. The reaction vessel was a glass tube with a 1.3 cm inside diameter and a 25 cm length.

A five weight percent solution of aqueous ammonia was prepared at 20° C. Five milliliters of the ammonia solution was injected into the reaction vessel using a syringe, wetting the absorbent paper layer. At the same time, 0.4 ml of dichloromethylsilane was injected into the inside of the porous medium. The reaction vessel was then rotated at a speed of 40 revolutions per minute. One hour later it was rotated at 10 revolutions per minute for 12 hours. At the end of 12 hours the absorbent layer was slit and the porous medium tube was blown by compressed air for one minute and washed with distilled water twice followed by drying at 3 hours at 120° C.

EXAMPLE 2

This example illustrates the preparation of a flat form heterogeneous Vycor-polydimethylsiloxane membrane.

The apparatus is that as shown in FIG. 1. The porous medium was a flat piece of Vycor glass having a thickness of 0.32 cm and an effective area of 10 cm$^2$. The membrane was placed tightly between the monomer chamber and the catalyst chamber. The volume ratio of the two chambers was 1:1. Three layers of absorbent paper towel covered the Vycor glass surface of the catalyst solution chamber. The two chambers were closed with rubber stoppers and 2.0 ml of dichloromethylsilane was injected through a rubber stopper into the monomer chamber. Next, 3.0 ml of 5 weight percent aqueous ammonia solution were injected into the catalyst chamber wetting the absorbent material. The vessels were kept vertically with the monomer chamber at the bottom and the solution chamber on top at 20° C. for 12 hours. The membrane was then washed out with distilled water followed by drying for 3 hours at 120° C.

EXAMPLE 3

This example illustrates an alternative method to prepare the heterogeneous dimethylsiloxane membrane using ammonium carbonate solution. A solution of ammonium carbonate having 23 grams of ammonium carbonate and 50 ml of water was prepared at 20° C. The apparatus shown in FIG. 2 was employed. Five milliliters of the ammonium carbonate solution was injected into the reaction chamber. 0.4 ml of dichlorodimethylsilane were injected into the interior of the tubular porous medium 31. The reaction vessel was rotated at 40 revolutions per minute for one hour followed by rotation at 10 revolutions per minute for 10 hours. The tube was washed by distilled water followed by drying for one hour at 150° C.

EXAMPLE 4

This example shows the preparation of a tube form of heterogeneous dimethylsiloxane membrane by filling the tube side with ammonia solution and the shell side with dichlorodimethylsilane.

The system shown in FIG. 2 was modified. A rod of absorbent paper towel with a diameter less than the inside diameter of the porous medium 31 was pushed into the interior of the porous medium 31. The rod was a cylinder of the paper towel formed by rolling a piece of paper towel up in one direction into a rod shape. Once inserted within the porous medium it was rotated in the opposite direction to unroll the paper towel and fill the tube, directly contacting the absorbent material to the interior wall of the porous medium. The two ends of the tube were again closed with rubber stoppers. Three ml of a 5 weight percent aqueous ammonia solution was injected into the interior of the porous medium. At the same time, 0.4 ml of dichlorodimethylsilane were injected into the reaction chamber. When the injections were completed the vessel was rotated horizontally at 40 revolutions per minute for an hour and 10 revolutions per minute for 10 hours and placed in an oven where the temperature was increased at 10° C. per minute to 130° C. where it was kept for 2 hours.

The heterogeneous membrane as prepared according to the Example 2 was useful in high temperature gas separation. Table 1 shows some separation factors of the membrane at different temperatures.

TABLE 1

| T° C. | 20 + 1.0 | 50 + 1.0 | 100 + 1.5 | 160 + 1.5 | 200 + 1.5 |
|---|---|---|---|---|---|
| He/$N_2$ | 1.95 | 2.10 | 2.21 | 2.98 | 3.58 |
| $O_2$/$N_2$ | 1.88 | 1.76 | 1.65 | 1.40 | 1.21 |
| $H_2$/$N_2$ | 2.48 | 2.82 | 3.03 | 3.45 | 3.58 |
| $CH_4$/$N_2$ | 2.87 | 2.67 | 2.41 | 2.17 | 2.10 |
| $C_2H_4$/$N_2$ | 7.11 | 5.20 | 3.58 | 2.52 | 2.14 |
| $CO_2$/$N_2$ | 9.94 | 6.24 | 4.23 | 2.87 | 2.30 |

This data shows that the heterogeneous membrane has selectivities similar to those of commercial polydimethylsiloxane rubber membranes at room temperature. The data in Table 2 shows that the heterogeneous membrane can withstand high temperatures.

TABLE 2

| | Permeability × $10^7$ (cc.cm/sec.cmHg.$cm^2$) | | | |
|---|---|---|---|---|
| Gas | 3 hrs | 20 hrs | 80 hrs | 300 hrs |
| $O_2$ | 1.49 | 1.37 | 1.36 | 1.36 |
| $N_2$ | 0.68 | 0.71 | 0.72 | 0.72 |
| He | 1.09 | 1.04 | 1.05 | 1.04 |

In obtaining these data, the membrane was placed in an oven at 210° C. for various lengths of time and the flux measured at room temperature.

The heterogeneous membranes of the present invention can be further modified by pyrolysis to form molecular sieves having very well defined pore sizes.

The basic idea of the pyrolysis procedure is that under suitable conditions a cross-linked polysiloxane will be oxidized, nitrogenated or decarbonized. The polysiloxane will form a rigid framework with a pore size being close to the molecular size. In accordance with this procedure the pyrolysis is conducted at a constant temperature under a continual flow of a gas.

Generally the pyrolysis will occur at a range of 300°–530° C. preferably at 380°–420° C. The pyrolysis of the microporous membrane is conducted in a stainless steel vessel while passing the gas over the supported heterogeneous membrane. The gas flow rate should be from about 0.3 to 5 ml per second per $cm^2$ of cross sectional area of the vessel. The preferred rate is 1.2 to 2.0. By selection of the appropriate gas and pyrolysis temperature various permeation rates for different gases can be obtained. Suitable gases include $H_2$, $N_2$, $O_2$ and He.

The following five examples illustrate the preparation of a silicone molecular sieve according to the present invention. In each of these examples a tubular heterogeneous membrane was prepared as in Example 1 with the temperature, cross-linking degree, catalyst, and other limitations as listed below. The pyrolysis conditions including gas, temperature and time are listed below along with the ratio of permeability of the obtained pyrolized membrane.

EXAMPLE 5

This example illustrates the preparation of the silicone molecular sieve membrane from dichlorodimethylsilane and trichloromethylsilane.

| | | |
|---|---|---|
| POLYMER-IZATION | Temperature (°C.) | 5 |
| | Crosslinking Degree (%) | 50 |
| | Aqueous Ammonia Solution Weight Percent (%) | 2 |
| | Mole Ratio of Monomer to Catalyst $M_m$:$M_c$ | 1:3 |
| | Amount of Monomer Per Area of Membrane (ml/$M^2$) | 75 |
| | Time (hr) | 8 |
| PYROL-YSIS | Gas | $O_2$ |
| | Temperature (°C.) | 380 |
| | Gas Flow Rate Per Unit Area of the Vessel (ml/sec.$cm^2$) | 2.0 |
| | Time (hr) | 12 |
| RATIO OF PERMEA-BILITY | Permeability of Hydrogen p$H_2$ × $10^7$ (cc.cm/sec.cmHg.$cm^2$) | 5.9 |
| | p$H_2$/$P_{Ar}$ | 3.0 |
| | p$H_2$/$P_{CO}$ | 2.3 |
| | p$H_2$/$P_{CO2}$ | 1.6 |
| | p$H_2$/$P_{O2}$ | 2.7 |
| | p$H_2$/$P_{N2}$ | 2.7 |

EXAMPLE 6

This example illustrates the preparation of a high degree of crosslinking silicone molecular sieve membrane from trichloromethyl silane using oxygen as the pyrolysis gas.

| POLYMER-IZATION | Temperature (°C.) | 5 |
|---|---|---|
| | Crosslinking Degree (%) | 100 |
| | Aqueous Ammonia Solution Weight Percent (%) | 2 |
| | Mole Ratio of Monomer to Catalyst $M_m:M_c$ | 1:3 |
| | Amount of Monomer Per Area of Membrane (ml/M$^2$) | 75 |
| | Time (hr) | 8 |
| PYROL-YSIS | Gas | $O_2$ |
| | Temperature (°C.) | 420 |
| | Gas Flow Rate Per Unit Area of the Vessel (ml/sec.cm$^2$) | 2.0 |
| | Time (hr) | 12 |
| RATIO OF PERMEA-BILITY | Permeability of Hydrogen $pH_2 \times 10^7$ (cc.cm/sec.cmHg.cm$^2$) | 3.7 |
| | $pH_2/P_{Ar}$ | 4.3 |
| | $pH_2/P_{CO}$ | 10.7 |
| | $pH_2/P_{CO2}$ | 0.9 |
| | $pH_2/P_{O2}$ | 6.5 |
| | $pH_2/P_{N2}$ | 9.3 |

EXAMPLE 7

This example shows the preparation of a silicone molecular sieve membrane from trichloromethylsilane using nitrogen as the pyrolysis gas.

| POLYMER-IZATION | Temperature (°C.) | 5 |
|---|---|---|
| | Crosslinking Degree (%) | 100 |
| | Aqueous Ammonia Solution Weight Percent (%) | 2 |
| | Mole Ratio of Monomer to Catalyst $M_m:M_c$ | 1:3 |
| | Amount of Monomer Per Area of Membrane (ml/M$^2$) | 75 |
| | Time (hr) | 8 |
| PYROL YSIS | Gas | $N_2$ |
| | Temperature (°C.) | 420 |
| | Gas Flow Rate Per Unit Area of the Vessel (ml/sec.cm$^2$) | 2.0 |
| | Time (hr) | 12 |
| RATIO OF PERMEA-BILITY | Permeability of Hydrogen $pH_2 \times 10^7$ (cc.cm/sec.cmHg.cm$^2$) | 2.7 |
| | $pH_2/P_{Ar}$ | 7.2 |
| | $pH_2/P_{CO}$ | 31.8 |
| | $pH_2/P_{CO2}$ | 1.3 |
| | $pH_2/P_{O2}$ | 3.4 |
| | $pH_2/P_{N2}$ | 11.5 |

EXAMPLE 8

This example illustrates the preparation of a silicone molecular sieve membrane from trichloromethylsilane using a small quantity of monomer.

| POLYMER-IZATION | Temperature (°C.) | 5 |
|---|---|---|
| | Crosslinking Degree (%) | 100 |
| | Ammonian Aquanic Solution Weight Percent (%) | 2 |
| | Mole Ratio of Monomer to Catalyst $M_m:M_c$ | 1:3 |
| | Amount of Monomer Per Area of Membrane (ml/M$^2$) | 50 |
| | Time (hr) | 8 |
| PYROL-YSIS | Gas | $O_2$ |
| | Temperature (°C.) | 420 |
| | Gas Flow Rate Per Unit Area of the Vessel (ml/sec.cm$^2$) | 2.0 |
| | Time (hr) | 12 |
| RATIO OF PERMEA-BILITY | Permeability of Hydrogen $pH_2 \times 10^7$ (cc.cm/sec.cmHg.cm$^2$) | 5.1 |
| | $pH_2/P_{Ar}$ | 4.3 |
| | $pH_2/P_{CO}$ | 8.1 |
| | $pH_2/P_{CO2}$ | 0.9 |
| | $pH_2/P_{O2}$ | 2.9 |
| | $pH_2/P_{N2}$ | 8.7 |

EXAMPLE 9

This example illustrates the preparation of a silicone molecular sieve membrane using dichlorodiethylsilane and trichloromethylsilane.

| POLYMER-IZATION | Temperature (°C.) | 5 |
|---|---|---|
| | Crosslinking Degree (%) | 50 |
| | Ammonian Aquanic Solution Weight Percent (%) | 2 |
| | Mole Ratio of Monomer to Catalyst $M_m:M_c$ | 1:3 |
| | Amount of Monomer Per Area of Membrane (ml/M$^2$) | 50 |
| | Time (hr) | 8 |
| PYROL-YSIS | Gas | $O_2$ |
| | Temperature (°C.) | 380 |
| | Gas Flow Rate Per Unit Area of the Vessel (ml/sec.cm$^2$) | 2.0 |
| | Time (hr) | 12 |
| RATIO OF PERMEA-BILITY | Permeability of Hydrogen $pH_2 \times 10^7$ (cc.cm/sec.cmHg.cm$^2$) | 6.4 |
| | $pH_2/P_{Ar}$ | 3.8 |
| | $pH_2/P_{CO}$ | 3.1 |
| | $pH_2/P_{CO2}$ | 1.9 |
| | $pH_2/P_{O2}$ | 2.9 |
| | $pH_2/P_{N2}$ | 2.9 |

Thus according to the present invention either a heterogeneous glass silicone membrane can be formed which is useful for separation purposes or an alternative molecular sieve membrane which is the pyrolized heterogeneous membrane can be formed. The heterogeneous membrane can be used for separation of various gases as well as for osmotic separations and the like. The pyrolized membranes in turn can be used as typical molecular sieves and in particular for the separation of gases. These membranes are particularly easy to manufacture using readily available materials and having a minimal number of steps. Further, porosity, pore volume and the like can be easily controlled by controlling the polymerization and/or pyrolysis reactions.

The proceeding has been a description of how to practice the present invention as well as the best mode of practicing the invention currently known to the inventors. However, the inventors intend to be bound only by the claims wherein we claim:

We claim:

1. A method of forming a heterogeneous membrane comprising:
   exposing a first surface of an inorganic microporous membrane to a chamber, said chamber including a silane reactive monomer, exposing a second surface of said inorganic microporous membrane to a saturated solution of an aqueous polysiloxane polymerizatin catalyst, permitting said catalyst to permeate said inorganic micoporous membrane;
   adjusting the atmosphere in said chamber to cause said silane reactivemonomer to permeate said inorganic microporous membrane from said first surface of said membrane;

whereby said catalyst causes said monomer to polymerize inside said inorganic microporous membrane forming polysiloxane.

2. The method claimed in claim 1 wherein said aqueous catalyst is contained in a second chamber positioned above said inorganic microporous membrane.

3. The method claimed in claim 2 wherein a porous material is positioned on the upper surface of said inorganic microporous membrane and said catalyst is put in said absorbent material whereby said absorbent material causes the surface of the inorganic microporous membrane to be saturated with said catalyst.

4. The method claimed in claim 3 further comprising pyrolyzing said heterogeneous membrane in the presence of a gas selected from the group consisting of $O_2$, $N_2$ and He.

5. The method claim in claim 1 wherein the molar ratio of said silane monomer to said catalyst is from 1/1 to 5/1.

6. The method claimed in claim 5 wherein the ratio of said monomer to water is from 0.005 to 0.012.

7. The method claimed in claim 1 wherein said inorganic microporous membrane is glass having a pore size of from 20 angstroms to 800 angstroms.

8. The method claim in claim 7 wherein said silane reactive monomer is a halogenated alkyl silane and said catalyst is a basic aqueous catalyst.

9. The method claimed in claim 1 wherein an absorbent material is placed on a surface of said inorganic microporous membrane and said catalyst is added to said material whereby said catalyst soaks through said material onto said surface.

10. The method claimed in claim 1 further comprising pyrolyzing said heterogeneous membrane to form a molecular sieve.

11. The method claimed 10 wherein said heterogeneous membrane is pyrolyzed in the presence of a gas selected from the group consisting of $O_2$, $N_2$ and $CO_2$.

12. The heterogeneous membrane produced according to the method claimed in claim 1 wherein said polysiloxane is within pores of said inorganic microporous membrane.

13. The heterogeneous membrane produced according to the method claimed in claim 3 wherein said polysiloxane is within pores of said inorganic microporous membrane.

14. A molecular sieve made according to the method of claim 10.

15. A method of forming a heterogeneous membrane comprising:

adding a silane reactive monomer to an interior portion of a hollow microporous member wherein the interior of said member is sealed;

placing said member in a chamber, said chamber including a catalyst solution;

rotating said chamber whereby silane monomer migrates through said microporous member and said catalyst solution migrates into said microporous member and react with each other to form polysiloxane in said microporous member.

16. The method claimed in claim 15 wherein a ratio of silane to water is 1/1 to 5/1.

17. The method claimed in claim 18 wherein said member is rotating by resting said member on said chamber and rotating said chamber.

18. The method claimed in claim 15 wherein an outer surface of said microporous member is wrapped with an absorbent material and said catalyst is added to said material thereby soaking into said material and contacting the outer surface of said microporous member.

19. The method claimed in claim 15 further comprising pyrolyzing said heterogeneous membrane in the presence of a gas selected from the group consisting of $O_2$, $N_2$ and He.

20. The heterogeneous membrane produced according to the method claimed in claim 15 wherein said polysiloxane is with pores of said inorganic microporous membrane.

21. A method of forming a heterogeneous membrane comprising:

adding a catalyst solution to an interior portion of a sealed hollow microporous member;

placing said member in a reaction chamber;

adding silane reaction monomer in said reaction chamber;

rotating said reaction chamber and thereby said member whereby catalyst solution migrates through said member and silane reactive monomer migrates through said member reacting with said catalyst thereby forming a heterogeneous polysiloxane member.

22. The method claimed in claim 21 further comprising pyrolyzing said heterogeneous membrane in the presence of a gas selected from the group consisting of $O_2$, $N_2$ and He.

23. The heterogeneous membrane produced according to the method claimed in claim 21 wherein said polysiloxane is within pores of said inorganic microporous membrane.

24. A heterogeneous membrane comprising an inorganic silica membrane having pores from about 20 to about 800 angstrom; and polysiloxane in said pores substantially reducing the size of said pores.

* * * * *